(12) United States Patent
Zhao et al.

(10) Patent No.: US 8,765,310 B2
(45) Date of Patent: Jul. 1, 2014

(54) NONAQUEOUS ELECTROLYTIC SOLUTION AND NONAQUEOUS ELECTROLYTE SECONDARY BATTERY USING THE SAME

(75) Inventors: Jinbao Zhao, Ibaraki (JP); Norio Iwayasu, Hitachinaka (JP); Yuuki Okuda, Hitachi (JP); Hidetoshi Honbo, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 430 days.

(21) Appl. No.: 13/094,902

(22) Filed: Apr. 27, 2011

(65) Prior Publication Data
US 2011/0269026 A1 Nov. 3, 2011

(30) Foreign Application Priority Data
Apr. 27, 2010 (JP) .................................. 2010-102364

(51) Int. Cl.
*H01M 6/04* (2006.01)
*H01M 6/16* (2006.01)
*H01M 10/056* (2010.01)

(52) U.S. Cl.
USPC ........................... 429/332; 429/188; 429/207

(58) Field of Classification Search
USPC .......................................... 429/332, 188, 207
See application file for complete search history.

(56) References Cited

U.S. PATENT DOCUMENTS

| 5,776,627 | A | 7/1998 | Mao et al. |
| 5,879,834 | A | 3/1999 | Mao |
| 2010/0216029 | A1* | 8/2010 | Iwayasu ........................ 429/304 |
| 2011/0189550 | A1 | 8/2011 | Zhao et al. |

FOREIGN PATENT DOCUMENTS

| JP | 7302614 | 11/1995 |
| JP | 9171840 | 6/1997 |
| JP | 10321258 | 12/1998 |
| JP | 3275998 | 2/2002 |
| JP | 2009-211941 | 9/2009 |
| JP | 2011-159550 | 8/2011 |

OTHER PUBLICATIONS

Chinese Official Action dated Jul. 18, 2013, for CN Application No. 201110106168.7.
Japanese Official Action dated Aug. 22, 2013, for JP Application No. 2010-102364.

* cited by examiner

*Primary Examiner* — Karie Apicella
(74) *Attorney, Agent, or Firm* — Antonelli, Terry, Stout & Kraus, LLP.

(57) ABSTRACT

A nonaqueous electrolytic solution which may suppress the overcharge of a battery and a nonaqueous electrolyte secondary battery using the solution are provided. The overcharge of the battery is suppressed by undergoing the electrolytic polymerization in the solution when the battery is overcharged, and simultaneously more effectively suppressed by increasing the internal resistance of the battery. The nonaqueous electrolytic solution comprises a polymer which undergoes the electrolytic polymerization in the range of 4.3V or more to 5.5V or less at the lithium metal standard voltage, having a repeating unit represented by the formula (1), an electrolytic salt and a nonaqueous solvent.

Formula (1)

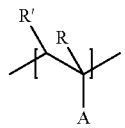

[where, A is a functional group which undergoes the electrolytic polymerization in the range of 4.3V or more to 5.5V or less at the lithium metal standard voltage, R and R' are each independently an hydrogen atom or a methyl group]

9 Claims, 3 Drawing Sheets

NONAQUEOUS ELECTROLYTIC SOLUTION AND NONAQUEOUS ELECTROLYTE SECONDARY BATTERY USING THE SAME

CROSS REFERENCE TO RELATED APPLICATIONS

This application claims the foreign priority benefit under Title 35, United State Code, 119 (a)-(d) of Japanese Patent Application No. 2010-102364, filed on Apr. 27, 2010 in the Japan Patent Office, the disclosure of which is herein incorporated by reference in its entirety.

BACKGROUND OF THE INVENTION

1. Field of the Invention

The present invention relates to a nonaqueous electrolytic solution and a nonaqueous electrolyte secondary battery using the solution.

2. Description of the Related Art

In a lithium-ion secondary battery using a nonaqueous electrolytic solution (that is, nonaqueous electrolyte secondary battery: or referred to "battery", hereinafter), if the battery is overcharged using a voltage larger than a normal operating voltage (normally, 4.2V at full charge if $LiCoO_2$ is used as a cathode), excess lithium-ions may be released from a cathode, and simultaneously an excess amount of a lithium metal is generated in an anode to produce a dendrite thereof. Accordingly, the cathode and the anode become chemically unstable, whereby carbonates generally included in the nonaqueous electrolytic solution may react with the lithium metal to undergo the decomposition, resulting in causing a rapid exothermic reaction. The exothermic reaction may excessively heat the whole battery, thereby to spoil the safety of the battery.

Generally, a battery comprises a protection circuit or the like so that such a protection circuit prevents the battery from being overcharged. As a result, the above mentioned accident may not be happened. However, assuming that a charger or a protection circuit goes out of order, it is demanded to secure the high safety of the battery, even if the battery is overcharged. In particular, such a demand is growing more and more as long as an energy density or a capacity of the battery is increasing.

For responding to the demand as mentioned above, a method for securing the safety against the overcharge is disclosed, in which a small amount of an aromatic compound is added to an electrolytic solution as an additive agent. See the Japanese Patent Publication No. 3275998, the Japanese Laid-Open Patent Publication Nos. H09-171840, H10-321258, and H07-302614, and Electrochemical and Solid-State Letters, 9(1), A24-A26 (2006). More specifically, for example, the Japanese Patent Publication No. 3275998, the Japanese Laid-Open Patent Publication Nos. H09-171840 and H10-321258 disclose that the overcharge of the battery is suppressed by operating an internal electricity shutdown device through generating a gas, or generating a conductive polymer, inside the battery when overcharged. Herein, the method is conducted by using cyclohexylbenzene, biphenyl, 3-R-thiophene, 3-chrolothiophen, and furan or the like which are dissolved in the electrolytic solution. Further, the Japanese Laid-Open Patent Publication No. H07-302614 discloses that an anisole derivative with MW of 500 or less is used as an additive agent for the electrolytic solution. Further, the overcharge may be suppressed, if an electroactive thiophene based polymer with several thousands MW such as poly(3-butylthiophene) and poly(3-phenylthiophene) are added to the electrolytic solution, as disclosed in Electrochemical and Solid-State Letters, 9(1), A24-A26 (2006).

Herein, each compound such as cyclohexylbenzene disclosed in the Japanese Patent Publication No. 3275998, the Japanese Laid-Open Patent Publication Nos. H09-171840, H10-321258, and H07-302614, and Electrochemical and Solid-State Letters, 9(1), A24-A26 (2006), has the effect of suppressing the overcharge of the battery through the electrolytic polymerization thereof in the nonaqueous electrolytic solution. However, after the compound is completely consumed through the electrolytic polymerization in the nonaqueous electrolytic solution, the overcharge of the battery may be caused again. In such a case, if the product formed through the electrolytic polymerization of the above mentioned compound has the effect of increasing the internal resistance of the battery, the effect of suppressing the overcharge may be enhanced. However, the product formed through the electrolytic polymerization of each compound described in the Japanese Patent Publication No. 3275998, the Japanese Laid-Open Patent Publication Nos. H09-171840, H10-321258, and H07-302614, and Electrochemical and Solid-State Letters, 9(1), A24-A26 (2006) respectively, has little effect of increasing the internal resistance of the battery.

Further, thiophene derivatives such as 3-R-thiophene and 3-chlorothiophene are electrochemically unstable, thereby to be easily decomposed in the battery, resulting in the decrease of the battery performance. In particular, thiophene undergoes the electrolytic polymerization at 4.0V or less at the lithium metal standard voltage. Accordingly, it is very difficult to use thiophene for the battery of which operating voltage is generally 4.0V or more.

SUMMARY OF THE INVENTION

The present invention has been developed in order to solve the above mentioned disadvantages. Therefore, an object of the present invention is to provide a nonaqueous electrolytic solution which may suppress an overcharge of a battery by undergoing electrolytic polymerization in the solution when the battery is overcharged, and more effectively suppress the overcharge of the battery by increasing internal resistance of the battery. Further, a nonaqueous electrolyte secondary battery using the nonaqueous electrolytic solution is also provided.

As a result of the development to solve the disadvantages, the inventors of the present invention find the followings: the overcharge of a battery may be suppressed by undergoing electrolytic polymerization in an electrolytic solution when the battery is overcharged, by adding a polymer which undergoes the electrolytic polymerization in a specific range of voltage and has a specific repeating unit, into the nonaqueous electrolytic solution. Further, simultaneously, the overcharge of the battery may be more effectively suppressed by increasing the internal resistance of the battery as the result of the electrolytic polymerization. Accordingly, the nonaqueous electrolytic solution and the nonaqueous electrolyte secondary battery using the solution of the present invention may be realized, having the above mentioned advantageous suppressing effects on the overcharge of the battery.

According to the present invention, the nonaqueous electrolytic solution which may suppress the overcharge of the battery is provided, by undergoing the electrolytic polymerization therein when the battery is overcharged, and simultaneously more effectively suppress the overcharge by increasing the internal resistance of the battery. Further, the nonaqueous electrolyte secondary battery using the nonaqueous electrolytic solution is also provided.

DETAILED DESCRIPTION OF THE PREFERRED EMBODIMENT

Figure 1:
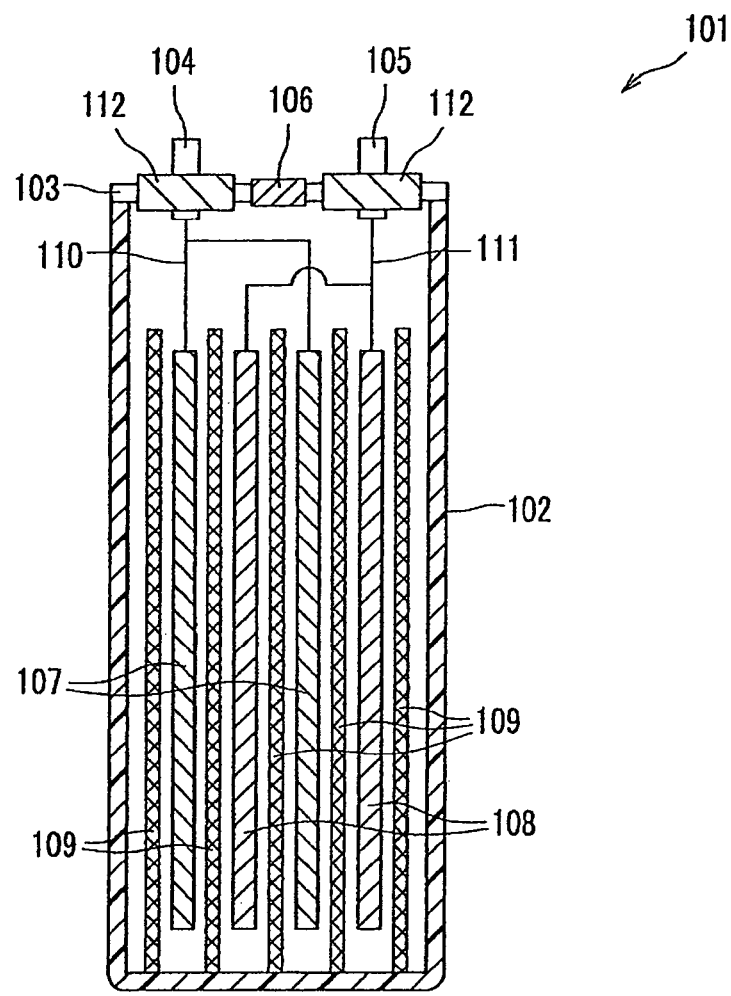
FIG. 1 is a schematic diagram showing a cross-section of the nonaqueous electrolyte secondary battery in a first embodiment of the present invention.

Next, embodiments of the present invention will be explained in reference to the attached drawings. However, the embodiments of the present invention are not limited to the embodiments described hereinafter.

[1. Nonaqueous Electrolytic Solution]

The nonaqueous electrolytic solution of the present invention includes a polymer which undergoes electrolytic polymerization in the range of 4.3V or more to 5.5V or less at the lithium metal standard voltage and has a repeating unit represented by the following formula (1) (hereinafter, referred to polymer (1)), an electrolytic salt, and a nonaqueous solvent. Herein, the nonaqueous electrolytic solution may include one kind of the polymer (1) alone, or two or more kinds of the polymers (1) at an optional rate and in an optional combination thereof.

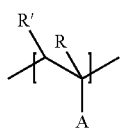

Formula (1)

[in the formula (1), "A" is a functional group which undergoes electrolytic polymerization in the range of 4.3V or more to 5.5V or less at the lithium metal standard voltage, R and R' are each independently an hydrogen atom or a methyl group]

[1-1. Polymer (1)]

The polymer (1) has a repeating unit represented by the above mentioned formula (1). In the formula (1), A is a functional group which undergoes electrolytic polymerization in the range of 4.3V or more to 5.5V or less at the lithium metal standard voltage.

Herein, the description that the polymer (1) "undergoes electrolytic polymerization in the range of 4.3V or more to 5.5V or less at the lithium metal standard voltage" means that a larger sized polymer is formed via the bond formation between the polymers (1) each other (that is, via undergoing polymerization). In other words, the polymer (1) is further polymerized by the electron included in the nonaqueous electrolytic solution, when the voltage in the range of 4.3V or more to 5.5V or less at the lithium metal standard voltage is applied to the battery. Then, the larger sized polymers produced through the electrolytic polymerization cover the surface of the electrode, allowing the internal resistance of the battery to be increased.

Further, as mentioned above, if $LiCoO_2$ is used as a cathode in a battery, the voltage in full charge is generally 4.2V. On the other hand, if a battery is overcharged using the voltage more than 5.5V, the battery may be broken in some cases. Therefore, the particularly important factor for increasing the internal resistance when the battery is overcharged, is that the polymer (1) "undergoes electrolytic polymerization in the range of 4.3V or more to 5.5V or less at the lithium metal standard voltage." The electrolytic polymerization of the polymer (1) conducted in the above mentioned voltage range allows the polymer (1) to stably exist except for the time when the battery is overcharged, which results in the advantage that the battery performance is not damaged.

Here, A may have an optional structure as long as the electrolytic polymerization is conducted in the range of 4.3V or more to 5.5V or less at the lithium metal standard voltage. Generally, A comprises a functional group which undergoes the electrolytic polymerization in the range of 4.3V or more to 5.5V or less at the lithium metal standard voltage (hereinafter, referred to "electrolytic polymerization functional group"), and a bonding group which binds A to the main chain of the polymer (1).

(Electrolytic Polymerization Functional Group)

The electrolytic polymerization functional group may have an optional structure as long as the structure does not markedly damage the effect of the present invention. Preferably, the electrolytic polymerization functional group may include an aromatic functional group, more preferably, an aromatic functional group comprising carbon atoms of 6 or more to 18 or less as the total number, and satisfying the Hückel rule.

Examples of the electrolytic polymerization functional group include: a functional group derived from an aromatic compound such as biphenyl, alkylbiphenyl like 2-methylbiphenyl, terphenyl, partially hydrogenated terphenyl, cyclopentylbenzene, cyclohexylbenzene, t-butylbenzene, t-amylbenzene, diphenylether, naphthalene, and dibenzofuran; a partially fluorinated functional group derived from an aromatic compound such as 2-fluorobiphenyl, 3-fluorobiphenyl, 4-fluorobiphenyl, 4,4'-difluorobiphenyl, o-cyclohexylfluorobenzene, and p-cyclohexylfluorobenzene; a functional group derived from a fluorine containing anisole compound such as 2,4-difluoroanisole, 2,5-difluoroanisole, 2,6-difluoroanisole, and 3,5-difluoroanisole. Herein, a part of the hydrogen atoms of the above mentioned aromatic functional group may be replaced by, for example, a fluorine atom. Further, the aromatic functional group may contain an atom besides a carbon atom in the aromatic ring. Herein, the atom contained therein besides a carbon atom may include, for example, a sulfur atom, a nitrogen atom, a silicone atom and an oxygen atom or the like.

Among the aromatic functional groups, from the viewpoint of the improvement of the safety and the battery profile when the battery is overcharged, preferably, the aromatic functional group may comprise: a functional group derived from an aromatic compound such as biphenyl, alkylbiphenyl like 2-methylbiphenyl, terphenyl, partially hydrogenated terphenyl, cyclopentylbenzene, cyclohexylbenzene, t-butylbenzene, t-amylbenzene, diphenylether, and dibenzofuran; and a partially fluorinated aromatic functional group derived from an aromatic compound such as 2-fluorobiphenyl, 3-fluorobiphenyl, 4-fluorobiphenyl, 4,4'-difluorobiphenyl, o-cyclohexylfluorobenzene, and p-cyclohexylfluorobenzene.

(Bonding Group)

The structure of the bonding group is optional as long as the bonding group binds the electrolytic polymerization functional group to the main chain of the polymer (1). Preferably, the bonding group has an ether bond or an ester bond. When the polymer (1) has an ether bond or an ester bond in the molecule, the affinity thereof to the nonaqueous solvent or the electrolytic salt described hereinafter may increase. This allows the solubility of the polymer (1) in the nonaqueous solvent to be increased, further the increase of the viscosity of the nonaqueous solvent to be suppressed. Note that the ether bond or the ester bond may be included in the electrolytic polymerization functional group.

A preferable structure of "A" is represented by the formula (2) and the formula (3).

$$-(C=O)-O-(X-O)_a-Y_1 \qquad \text{Formula (2)}$$

[in the formula (2), "X" is an alkyl group having 1 to 6 carbon atoms, or an aromatic functional group; "$Y_1$" is an aromatic functional group which undergoes the electrolytic polymerization in the range of 4.3V or more to 5.5V or less at the lithium metal standard voltage; "a" is an integer from 0 or more to 10 or less as an average value thereof.]

$$-(CH_2)_b-O-Y_2 \qquad \text{Formula (3)}$$

[in the formula (3), "$Y_2$" is an aromatic functional group which undergoes the electrolytic polymerization in the range of 4.3V or more to 5.5V or less at the lithium metal standard voltage; "b" is 0 or 1.]

The number average molecular weight (Mn) of the polymer (1) generally varies depending on the solubility in the nonaqueous electrolytic solution of the polymer (1) and the viscosity after solving the polymer (1) therein. Therefore, the number average molecular weight (Mm) of the polymer (1) is not limited to a specific value. However, the polymer (1) may be an oligomer formed by the polymerization of several monomers constituting the polymer (1). Preferably, the number average molecular weight of the polymer (1) is 2000 or more, and 100000 or less. If the number average molecular weight of the polymer (1) is too small, the purification of the polymer (1) may be difficult, or when the battery is overcharged, the increasing rate of the internal resistance of the battery including the polymer (1) may be decreased. In contrast, if the number average molecular weight of the polymer (1) is too large, the solubility of the polymer (1) in the nonaqueous electrolytic solution may be decreased, or the viscosity of the nonaqueous electrolytic solution may be increased. Accordingly, the performance of the battery including the polymer (1) may be lowered.

Here, the amount of the polymer (1) contained in the nonaqueous electrolytic solution of the present invention may be varied depending on a structure of the functional group in the polymer (1) molecule, a molecular weight thereof, a composition of the nonaqueous electrolytic solution, and solubility of the polymer (1) in the nonaqueous electrolytic solution, and is not limited to a specific value. However, from the viewpoint of enhancing the suppression effect of the polymer (1) on the overcharge more effectively, the concentration of the polymer (1) is preferably 0.1 mass % or more of the total amount of the nonaqueous electrolytic solution, more preferably, 0.5 mass % or more. The upper limitation of the concentration is, preferably, 10 mass % or less, more preferably, 5 mass % or less. If the concentration thereof is too high, the viscosity of the nonaqueous electrolytic solution may become too high, resulting in the deterioration of the load profile of the battery, or the increase of the costs of the nonaqueous electrolytic solution.

[1-2. Electrolytic Salt]

The nonaqueous electrolytic solution of the present invention contains an electrolytic salt. The electrolytic salt may be optionally selected as long as the effect of the present invention is not markedly deteriorated. For example, the electrolytic salt is preferably a lithium metal salt including: lithium perchlorate, a lithium organoboron salt, a fluorinated organolithium salt, and a lithium imide salt or the like. More specifically, examples of the lithium metal salt include, for example, $LiClO_4$, $LiPF_6$, $LiBF_4$, $LiAsF_6$, $LiSbF_6$, $LiCF_3SO_3$, $LiCF_3CO_2$, $Li_2C_2F_4(SO_3)_2$, $LiN(CF_3SO_2)_2$, $LiN(C_2F_5SO_2)_2$, $LiC(CF_3SO_2)_3$, $LiCnF_{2n+1}SO_3$ (n≥2), $LiN(RfOSO_2)_2$ (where, Rf is a fluoroalkyl group). Among the above mentioned salts, a fluorinated organolithium salt is most preferable as the electrolytic salt. The fluorinated organolithium salt has a strong anionic property and is easily ionized to be dissociated, which facilitates the salt to be dissolved in the nonaqueous electrolytic solution.

Note the electrolytic salt may be used alone, or two or more kinds of salts may be used at an optional rate and in an optional combination thereof.

The concentration of the electrolytic salt in the nonaqueous electrolytic solution is optionally selected as long as the effect of the present invention is not markedly deteriorated. Preferably, the concentration is 0.3 mol/l or more, and more preferably 0.7 mol/l or more. The upper limited concentration is preferably 1.7 mol/l or less, and more preferably 1.2 mol/l or less. If the concentration of the electrolytic salt is too low, the ion conductivity of the solution may be undesirably small. In contrast, if the concentration thereof is too high, the excess amount of electrolytic salt may precipitate because of exceeding the solubility.

[1-3. Nonaqueous Solvent]

The nonaqueous electrolytic solution of the present invention includes a nonaqueous solvent. The nonaqueous solvent may be optionally selected as long as the effect of the present invention is not markedly deteriorated. However, the nonaqueous electrolytic solution is preferably selected from a solvent having a high conductivity. More specifically, the nonaqueous solvent having the conductivity of 30 F/m or more is preferable. Further, as the nonaqueous solvent, esters such as carbonates are preferably used. The preferable examples of esters include: ethylene carbonate, vinylene carbonate, propylene carbonate, butylene carbonate, γ-butyrolactone, sulfur containing esters (for example, ethylene glycol sulfite) or the like. Among the above mentioned esters, cyclic esters are more preferable, including ethylene carbonate, vinylene carbonate, propylene carbonate, butylene carbonate, and γ-butyrolactone. Further, cyclic carbonates are most preferable, including ethylene carbonate, vinylene carbonate, propylene carbonate, and butylene carbonate.

Further, it is preferable to use a chain carbonate having polarity and low viscosity represented as dimethyl carbonate, diethyl carbonate, and methyl ethyl carbonate, and also a branched aliphatic carbonate. Accordingly, the nonaqueous solvent is preferably selected from the solvents including the cyclic carbonates and the chain carbonates. More preferably, the nonaqueous solvent is selected from the solvents including ethylene carbonate and the chain carbonates.

Further, in addition to the above mentioned nonaqueous solvents, the following solvents may be used, including chain alkyl esters such as methyl propionate, chain phosphate triesters such as trimethyl phosphate, nitrile based solvents such as 3-methoxypropionitrile, and branched compounds having an ether bond such as dendrimer and dendron.

Moreover, a fluorinated solvent may be used as the nonaqueous solvent. More specifically, examples of the fluorinated solvent include: straight chain (perfluoroalkyl)alkyl ethers such as $H(CF_2)_2OCH_3$, $C_4F_9OCH_3$, $H(CF_2)_2OCH_2CH_3$, $H(CF_2)_2OCH_2CF_3$, $H(CF_2)_2CH_2O(CF_2)_2H$, $CF_3CHFCF_2OCH_3$, $CF_3CHFCF_2OCH_2CH_3$; and iso-(perfluoroalkyl)alkyl ethers such as 2-trifluoromethyl hexafluoropropyl methyl ether, 2-trifluoromethyl hexafluoropropyl ethyl ether, 2-trifluoromethyl hexafluoropropyl propyl ether, 3-trifluoromethyl octafluorobutyl methyl ether, 3-trifluoromethyl octafluorobutyl ethyl ether, 3-trifluoromethyl octafluorobutyl propyl ether, 4-trifluoromethyl decafluoropentyl methyl ether, 4-trifluoromethyl decafluoropentyl ethyl ether, 4-trifluoromethyl decafluoropentyl propyl ether, 5-trifluoromethyl dodecafluorohexyl methyl ether, 5-trifluoromethyl dodecafluorohexyl ethyl ether, 5-trifluoromethyl dodecafluorohexyl propyl ether, 6-trifluoromethyl tetradecafluoroheptyl methyl ether, 6-trifluoromethyl tetradecafluoroheptyl ethyl ether, 6-trifluoromethyl tetradecafluoroheptyl propyl ether, 7-trifluoromethyl hexadecafluorooctyl methyl ether, 7-trifluoromethyl hexadecafluorooctyl ethyl ether, 7-trifluoromethyl hexadecafluorooctyl hexyl ether or the like.

Note that the straight chain (perfluoroalkyl)alkyl ethers and iso-(perfluoroalkyl)alkyl ethers may be used together, as the nonaqueous solvent.

Here, the nonaqueous solvent may be included alone in the nonaqueous electrolytic solution, or two or more kinds of solvents may be included at an optional rate and in an optional combination thereof.

[1-4. Other Additive Agent]

The nonaqueous electrolytic solution of the present invention includes the above mentioned polymer (1), an electrolytic salt and a nonaqueous solvent. Further, in addition to the materials, other additive agent may be optionally included as long as the effect of the present invention is not markedly deteriorated. Herein, the additive agent may be included alone in the nonaqueous electrolytic solution, or two or more kinds of agents may be included at an optional rate and in an optional combination thereof.

Foe example, the nonaqueous electrolytic solution of the present invention may include a compound having a C=C unsaturated bond (or double bond) in the molecule thereof (hereinafter, the compound is referred to an "unsaturated compound"). By including the unsaturated compound in the nonaqueous electrolytic solution of the present invention, it is possible to more effectively suppress the decrease in the charge/discharge cycle profile of the battery using the nonaqueous electrolytic solution. More specifically, examples of the unsaturated compound include: an aromatic compound such as $C_8H_8C_8H_{11}$ (cyclohexylbenzene); a fluorinated aliphatic compound such as $H(CF_2)_4CH_2OOCCH=CH_2$ and $F(CF_2)_8CH_2CH_2OOCCH=CH_2$; and a fluorinated aromatic compound. Further, a compound containing a sulfur atom such as 1,3-propane sultone and 1,2-propanediol sulfate esters (for example, chain or cyclic sulfonic acid esters, chain or cyclic sulfuric acid esters), vinylene carbonate, vinylethylene carbonate, fluoroethylene carbonate may be also used as an additive agent. By using the above mentioned additive agents, it is possible to more effectively suppress the decrease in the charge/discharge cycle profile. In particular, if a carbon material with high crystallinity is used as an anode active material (described hereinafter), vinylene carbonate, vinylethylene carbonate and fluoroethylene carbonate are especially preferable as the additive agent. Herein, vinylene carbonate, vinylethylene carbonate and fluoroethylene carbonate form a protective coating film respectively on the surface of the anode, when the battery using the nonaqueous electrolytic solution including the carbonates is charged. The protective coating film may suppress the reaction caused by the contact of the anode active material with the nonaqueous electrolytic solution, which results in the prevention of the decomposition of the nonaqueous electrolytic solution caused by such a reaction.

The concentration of the above mentioned additive agent in the nonaqueous electrolytic solution is optionally selected as long as the effect of the present invention is not markedly deteriorated. Preferably, the concentration thereof is from 0.05 mass % or more to 5 mass % or less.

Further, the nonaqueous electrolytic solution of the present invention may contain an acid anhydride. This allows the high-temperature profile of the battery using the nonaqueous electrolytic solution to be more effectively improved.

Generally, an acid hydride participates in the formation of a composite coating film on the anode surface as a surface modifier, and has a function for further improving the charging profile of the battery under the high temperature condition. Further, the acid anhydride contained in the nonaqueous electrolytic solution can decrease the water amount included in the nonaqueous electrolytic solution, allowing the amount of gas generation in the battery using the nonaqueous electrolytic solution to be decreased.

Herein, the acid anhydride contained in the nonaqueous electrolytic solution is not limited to a specific compound as long as the acid anhydride has at least one structural portion of an acid anhydride in the molecule thereof. For example, the acid anhydride may include mellitic anhydride, malonic anhydride, maleic anhydride, butyric anhydride, propionic anhydride, pulvinic anhydride, phthalonic anhydride, phthalic anhydride, pyromellitic anhydride, lactic anhydride, naphthalic anhydride, toluic anhydride, thiobenzoic anhydride, diphenic anhydride, citraconic anhydride, diglycol carbamidic anhydride, acetic anhydride, succinic anhydride, cinnamic anhydride, glutaric anhydride, glutaconic anhydride, valeic anhydride, itaconic anhydride, isobutyric anhydride, isovaleric anhydride, and benzoic anhydride. Note the acid anhydride may be contained alone, or two or more kinds of anhydrides may be contained at an optional rate and in an optional combination thereof.

When the nonaqueous electrolytic solution of the present invention contains the acid anhydride, the concentration thereof is optionally selected as long as long as the effect of the present invention is not markedly deteriorated. Preferably, the concentration is from 0.05 mass % or more to 1 mass % or less.

[2. Method for Producing Nonaqueous Electrolytic Solution]

The nonaqueous electrolytic solution of the present invention may be produced by an optional production method as long as long as the effect of the present invention is not markedly deteriorated. Hereinafter, a method for producing the nonaqueous electrolytic solution of the present invention will be explained showing examples. However, the nonaqueous electrolytic solution of the present invention is not produced only by the method described below.

[2-1. Method for Producing Polymer (1)]

The polymer (1) included in the nonaqueous electrolytic solution of the present invention may be produced by an optional production method as long as long as the effect of the present invention is not markedly deteriorated. For example, the polymer (1) may be produced by polymerizing the electrolytic polymerization functional group described in [1-1. Polymer (1)] with a polymerizable monomer comprising a C=C unsaturated bond. As the polymerizable monomer, a modified monomer derivative in which the electrolytic polymerization functional group is bound to a polymerizable monomer having a C=C unsaturated bond such as a vinyl group, an allyl group, an acryloyl group, a (meth)acryloyl group or the like, is preferably used.

Herein, the number of the C=C unsaturated bond included in the above mentioned polymerizable monomer is optionally selected as long as the effect of the present invention is not markedly deteriorated. Preferably, the number of the C=C unsaturated bond is one. If the number of the included C=C unsaturated bond is two or more, a cross-linking reaction in the molecule of the polymerizable monomer may be occurred, potentially resulting in the decrease of the solubility of the reacted monomer in the nonaqueous electrolytic solution.

Preferably, the above mentioned polymerizable monomer has an ether bond or an ester bond in the molecule. When a polymer (1) is produced by polymerizing the polymerizable monomer having an ether bond or an ester bond, the obtained polymer (1) has a high affinity to the electrolytic salt and the nonaqueous solvent. This allows the solubility of the polymer (1) in the nonaqueous electrolytic solution to be increased, and simultaneously the increase in the viscosity of the nonaqueous electrolytic solution to be suppressed.

From the viewpoint of the electrochemical stability of the polymer (1) in the nonaqueous electrolytic solution, it is preferable to purify the polymerizable monomer in advance so as to produce the polymer (1) by polymerizing the purified polymerizable monomer, and then, to mix the polymer (1) thus obtained with the nonaqueous electrolytic solution. As the polymerizable monomer, it is preferable to use, for example, acrylates (methacrylates) having a functional group such as a biphenyl group and a cyclohexylphenyl; ethers having a functional group such as an allyl group and a vinyl group; and esters.

For example, a polymerizable monomer having an ether bond or an ester bond in the molecule includes the polymerizable monomer represented by the following formula (2').

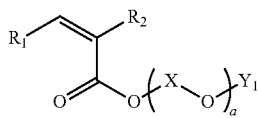

Formula (2')

(in the formula (2'), $R_1$ and $R_2$ are each independently a hydrogen atom or a methyl group; X is an alkyl group having carbon atoms from 1 or more to 6 or less, or an aromatic functional group; $Y_1$ is an aromatic functional group which undergoes electrolytic polymerization in the range of 4.3V or more to 5.5V or less at the lithium metal standard voltage; and "a" is an integer from 0 or more to 10 or less as average.)

Examples of the polymerizable monomer represented by the above mentioned formula (2') include ethoxylated cyclohexylphenyl acrylates having ethylene oxide (EO: EO=1-10 mol); and acrylate based monomer represented as 4-cyclohexylphenylacrylate, 4-biphenylacrylate, 4-cyclohexylphenylmethacrylate, 4-biphenyl methacrylate. Note the polymerizable monomer may be used alone, or two or more kinds of monomers may be used at an optional rate and in an optional combination thereof.

Further, for example, a polymerizable monomer having an ether bond or an ester bond in the molecule includes the polymerizable monomer represented by the following formula (3').

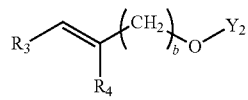

Formula (3')

(in the formula (3'), $R_3$ and $R_4$ are each independently a hydrogen atom or a methyl group; $Y_2$ is an aromatic functional group which undergoes the electrolytic polymerization in the range of 4.3V or more to 5.5V or less at the lithium metal standard voltage; and "b" is 0 or 1.)

Here, examples of the polymerizable monomer represented by the following formula (3') include: allyl ethers and vinyl ethers represented as allyl phenyl ether, allyl benzyl ether, 4-cyclohexylphenyl allyl ether, 2-phenyl-1-cyclohexyl allyl ether, allyl biphenyl ether, biphenyl vinyl ether, and ethoxylated cyclohexylphenyl vinyl ethers having an ethylene oxide (EO) group (EO=1-10 mol); vinyl ester based monomer represented as vinyl 4-cyclohexylbenzoate, vinyl biphenyl-4-carboxylate, vinyl 4'-fluorobiphenyl-4-carboxylate, vinyl 4-cyclohexylbenzoate having an ethylene oxide group, vinyl biphenyl-4-carboxylate to which ethylene oxide is added; and organic acid esters (or allyl esters) having an allyl functional group represented as allyl 4-cyclohexylbenzoate, allyl 4-cyclohexylbenzoate having an ethylene oxide group, allyl 4'-fluorobiphenyl-4-carboxylate.

By polymerizing the above mentioned polymerizable monomer, the polymer (1) may be produced. Herein, the polymerization procedure is not limited to a specific method and a variety of conventional methods may be used for the polymerization including, for example, bulk polymerization, solution polymerization, and emulsion polymerization or the like. Preferably, solution polymerization is used for producing the polymer (1). Note the polymerization method is not limited to a specific method but radical polymerization is preferable.

When radical polymerization is conducted, a polymerization initiator may be used depending on the necessity for reaction. From the viewpoint of feasible handling of the reaction, it is preferable to use a radical polymerization initiator. Particularly, from the viewpoint of less deterioration in materials used in the electrochemical device, it is preferable to use a radical initiator having a 10-hour half-life temperature in the range from 30° C. or more to 90° C. or less; 10-hour half-life temperature being an index of the decomposition temperature and rate. Herein, "10-hour half-life temperature" refers to the temperature which is necessary so that the amount of the undecomposed radical polymerization initiator at the concentration of 0.01 mol/l in a radical inactivated solvent such as benzene decreases to the half of the initial amount after 10 hours.

When a radical polymerization initiator is used as a polymerization initiator, the amount of radical polymerization initiator used in the polymerization is, generally 0.1 mass % or more, preferably 0.3 mass % or more with respect to the polymerizable monomer. Further, the upper limit is, generally 5 mass % or less, preferably 2 mass % or less.

Examples of the radical polymerization initiator include: an organic peroxide such as t-butyl peroxy pivalate, t-hexyl peroxy pivalate, methyl ethyl ketone peroxide, cyclohexanone peroxide, 1,1-bis(t-butyl peroxy)-3,3,5-trimethylcyclohexane, 2,2-bis(t-butylperoxy)octane, n-butyl-4,4-bis(t-butyl peroxy) valerate, t-butul hydroperoxide, cumene hydroperoxide, 2,5-dimethylhexane-2,5-dihydroperoxide, di-t-butyl peroxide, t-butyl cumyl peroxide, dicumyl peroxide, α,α'-bis(t-butyl peroxy-m-isopropyl)benzene, 2,5-dimethyl-2,5-di(t-butyl peroxy)hexane, 2,5-dimethyl-2,5-di(t-butyl peroxy)heptane, benzoyl peroxide, t-butyl peroxy propyl carbonate; and an azo compound such as 2,2'-azobis [2-(2-imidazolin-2-yl)propane], 2,2'-azobis{2-methyl-N-[1,1-bis(hydroxymethyl)-2-hydroxyethyl]propionamide}, 2,2'-azobis{2-methyl-N-[1,1-bis(hydroxymethyl)ethyl] propionamide}, 2,2'-azobis[2-methyl-N-(2-hydroxyethyl) propionamide], 2,2'-azobis(2-methylpropionamide) dihydrate, 2,2'-azobis(2,4,4-trimethylpentane), 2,2'-azobis (2-methylpropane), dimethyl-2,2'-azobis isobutylate, 4,4'-azobis(4-cyanovaleric acid), 2,2'-azobis[2-(hydroxymethyl) propionitrile], and azobisisobutylonitrile.

Herein, the polymerization initiator may be used alone, or two or more kinds of initiators may be used at an optional rate and in an optional combination thereof.

When the polymerization is conducted by the radical polymerization, the polymerization conditions of temperature and time or the like may be set in the conventional conditions of temperature and time generally used.

Further, when the polymer (1) has an eater bond, the polymer (1) may be prepared without using the above mentioned polymerizable monomer. In such a case, a transesterification reaction between an optional polymer and a low molecular weight compound may be used. For example, using polyester as a base polymer, the transesterification reaction of the base polymer may be conducted with a low molecular weight ester, an acid or an alcohol each having the electrolytic polymerization functional group. Herein, the reaction conditions in the preparation may be set in the conventional transesterification conditions generally used.

As the base polymer, poly(methyl acrylate) and poly(methyl methacrylate) each having a low molecular weight are preferably used because of the low costs thereof.

As mentioned above, the nonaqueous electrolytic solution of the present invention may be produced by mixing the polymer (1) prepared through the polymerization of the polymerizable monomer, the electrolytic salt, the nonaqueous solvent, and the additive agent if needed, at the respective concentrations as described hereinbefore in the section of [1. Nonaqueous Electrolytic Solution]. Herein, the conditions in the mixing process such as the mixing temperature and procedure may be optionally set as long as the effect of the present invention is not markedly deteriorated.

[3. Nonaqueous Electrolyte Secondary Battery]

The nonaqueous electrolyte secondary battery of the present invention (referred to "battery of the present invention") comprises the nonaqueous electrolytic solution of the present invention, a cathode, an anode, and a separator.

[3-1. Cathode]

Any types of the cathode included in the battery of the present invention may be used as long as the effect of the present invention is not markedly deteriorated. Further, the cathode of the present invention may be produced by an optional method. For example, the cathode may be produced by the following steps. That is, to a cathode active material described hereinafter, are mixed a conductive aiding material such as carbon black and acetylene black, and a binder such as polyfluorovinylidene and polyethyleneoxide, whereby a cathode mixture is prepared. Then, the cathode mixture thus obtained and a current collector made of aluminum foil used as a core material are used for producing a strip-like formed body. Herein, preferably the obtained cathode may have a lithium-ion intercalation/de-intercalation ability.

As the cathode active material used in the cathode, a compound having the lithium-ion intercalation/de-intercalation ability is preferably used, for example, including a lithium containing composite oxide represented by $Li_xMO_2$ or $Li_yM_2O_4$ (where, M is a transition metal; $0 \leq x \leq 1$ and $0 \leq y \leq 2$), a spinel typed oxide, a metallic chalcogen compound with a layered structure, and an olivine structure compound. More specifically, the cathode active material includes: a metal oxide such as lithium cobalt oxide like $LiCoO_2$, lithium manganese oxide like $LiMn_2O_4$, lithium nickel oxide like $LiNiO_2$, lithium titanium oxide like $Li_{4/3}Ti_{5/3}O_4$, lithium-manganese-nickel composite oxide, lithium-manganese-nickel-cobalt composite oxide, manganese dioxide, vanadium pentoxide, chromium oxide; a material having an olivine crystal structure like $LiMPO_4$ (where, M is at least one metal selected from Fe, Mn, and Ni); and a metal sulfide such as titanium disulfide and molybdenum disulfide.

Particularly, lithium containing composite oxide with a layered structure or a spinel structure is preferably used as the cathode active material. For example, the composite oxide includes: lithium-manganese nickel composite oxide represented as $LiCoO_2$, $LiMn_2O_4$, $LiNiO_2$, $LiNi_{1/2}Mn_{1/2}O_2$; lithium-manganese nickel-cobalt composite oxide represented as $LiNi_{1/3}Mn_{1/3}CO_{1/3}O_2$ and $LiNi_{0.6}Mn_{0.2}CO_{0.2}O_2$; and a lithium containing composite oxide in which a part of the composing atoms is replaced by other metallic atom such as $LiNi_{1-x-y-z}CO_xAl_yMg_zO_2$ (where $0 \leq x \leq 1$, $0 \leq y \leq 0.1$, $0 \leq z \leq 0.1$ and $0 \leq 1-x-y-z \leq 1$).

When a lithium composite oxide of which circuit voltage at the charging time is 4V or more at the lithium metal standard voltage is used as a cathode active material, the lithium composite oxide may perform the maximum effect of the nonaqueous electrolytic solution of the present invention. As a result, it is possible to produce the battery with the higher safety.

Note the cathode active material may be used alone, or two or more cathode active materials may be used at an optional rate and in an optional combination thereof. For example, the lithium containing composite oxide having a layered structure and the lithium containing composite oxide having a spinel structure may be combined and used as the cathode active material. Accordingly, it is possible to produce the battery, compatibly having both improved high capacity and safety profiles.

[3-2. Anode]

Any types of the anode included in the battery of the present invention may be used as long as the effect of the present invention is not markedly deteriorated. Further, the anode of the present invention may be produced by an optional method. For example, the anode may be produced by the following steps. That is, an anode mixture is prepared by the anode active material alone described hereinafter. Alternatively, an anode mixture is prepared depending on the necessity as follows: to the anode active material described hereinafter, are mixed a conductive aiding material such as carbon black and acetylene black, and a binder such as polyfluorovinylidene and a styrene butadiene rubber, if needed. Then, the anode mixture thus obtained and a current collector made of copper foil used as a core material are used for producing a formed body of the anode. Herein, preferably the obtained anode may have a lithium-ion intercalation/de-intercalation ability.

Therefore, the above mentioned cathode and anode preferably have a lithium-ion intercalation/de-intercalation ability, respectively.

As the anode active material used in the anode, a compound which has the lithium-ion intercalation/de-intercalation ability may be preferably used. For example, such a compound includes various materials: a lithium metal simple substance, an alloy of Al, Si, Sn or In, an oxide capable of performing the charging/discharging at the low potential like lithium, and a carbon material. For the battery of the present invention, a carbon material which can electrochemically absorb/deabsorb a lithium-ion (that is, having the lithium-ion intercalation/de-intercalation ability) is most preferable as the anode active material. Such a carbon material includes: graphite, pyrocarbon, cokes, glass-like carbon, sintered body of organic polymer, mesocarbon microbeas, carbon fiber, and active carbon. Herein, the anode active material as described above may be used alone, or two or more anode active materials are used at an optional rate and in an optional combination thereof.

When a carbon material is used as the anode active material, the interlayer distance d002 of the lattice planes (002) of the carbon material is preferably 0.37 nm or less. Further, in order to realize a high capacity of the battery, the interlayer distance d002 is preferably 0.35 nm, more preferably 0.34 nm or less. The lower limit of the interlayer distance d002 is not limited to a specific value. Herein, the theoretical distance of the interlayer distance d002 is about 0.335 nm.

Further, the size of the carbon material crystalline in the c-axis direction (referred to Lc) is preferably 3 nm or more, more preferably 8 nm or more, and most preferably 25 nm or more. Although the upper limit of Lc is not limited to a specific value, generally Lc is about 200 nm.

Further, the shape and size of the carbon material are not limited specifically. However, for example, when the carbon material has a spherical shape, the size thereof (that is, the mean particle diameter) is preferably 3 μm or more, and more preferably 5 μm or more. The upper limit thereof is preferably 20 μm or less, and more preferably 15 μm or less. Moreover, the purity of the carbon material is preferably 99.9% or more.

[3-3. Separator]

Any types and materials of separators in the battery of the present invention may be used as long as the effect of the present invention is not markedly deteriorated. For example, various separators used in well-known nonaqueous electrolyte secondary batteries may be used. Examples of the separator include a microporous separator made of a polyolefin resin such as polyethylene and polypropylene, and a microporous separator made of a polyester resin such as polybutylene terephthalate. These separators are used preferably. Further, it is possible to laminate the microporous films so as to form the separator.

The thickness of the separator is not limited specifically. However, from the viewpoint of the high capacity and safety of the battery, the thickness of the separator is preferably from 5 μm or more to 30 μm or less.

Further, the ventilation rate (sec/100 mL) of the separator is not limited specifically. However, the ventilation rate (sec/100 mL) thereof is generally 10 or more, preferably 50 or more, and more preferably 90 or more. The upper limit of the ventilation rate is generally 1000 or less, preferably 800 or less, and more preferably 700 or less.

[3-4. Structure of Battery of Present Invention and Method for Producing the Battery]

Any types of structures of the battery of the present invention may be used as long as the battery includes the nonaqueous electrolytic solution, the cathode, the anode, and the separator of the present invention, and as long as the effect of the present invention is not markedly deteriorated. Hereinafter, the structures of the battery of the present invention will be explained in detail, referring to two embodiments respectively.

FIG. 1 is a diagram schematically showing a cross section of the battery in a first embodiment of the present invention. A battery 101 in FIG. 1 is configured, including a battery container 102, a cover 103, a cathode external terminal 104, an anode external terminal 105, a pouring inlet 106, two cathodes 107, two anodes 108, five separators 109, a cathode lead 110, an anode lead 111, and an insulating seal material 112. Herein, the separators 109 are arranged between the respective electrodes, and between the inner wall of the battery container 102 and the electrode. The cathode 107 is connected to the cathode external terminal 104 through the cathode lead 110. The anode 108 is connected to the anode external terminal 105 through the anode lead 111.

At the cover 103, the cathode external terminal 104 and the anode external terminal 105 are arranged each via the insulating seal material 112. Further, the pouring inlet 106 is arranged between the cathode external terminal 104 and the anode external terminal 105. From the pouring inlet 106, the nonaqueous electrolytic solution may be poured into the inside of the battery 101. The cover 103 is attached to the battery container 102 by welding. Note the cover 103 may be attached to the battery container 102 by other method, for example, by bending the cover 103 or by using a binding agent.

Figure 2:
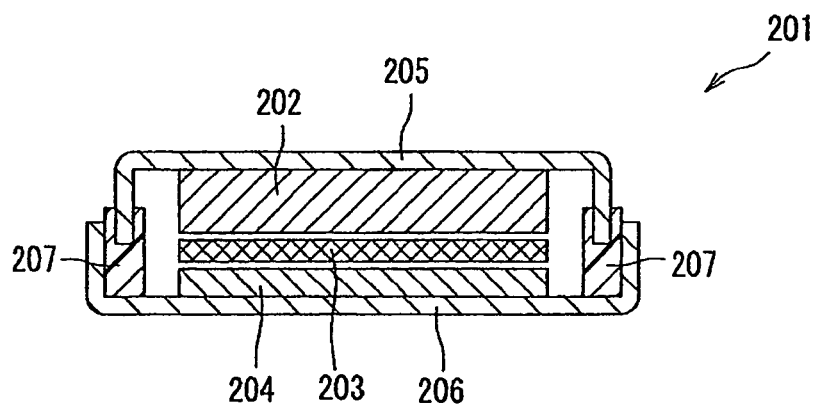
FIG. 2 is a schematic diagram showing a cross-section of the nonaqueous electrolyte secondary battery in a second embodiment of the present invention.

FIG. 2 is a diagram schematically showing a cross section of the battery in a second embodiment of the present invention. A battery 201 in FIG. 2 is configured, including a cathode 202, a separator 203, an anode 204, a cathode external terminal 205, an anode external terminal 206, and an insulating seal material 207. As shown in FIG. 2, the separator 203 is arranged between the cathode 202 and the anode 204. Further, the cathode 202 is tightly attached to the cathode external terminal 205, and the anode 204 is tightly attached to the anode external terminal 206, respectively, so as to be connected electrically. Herein, the cathode external terminal 205 and the anode external terminal 206 are electrically insulated by the insulating seal material 207.

In the battery of the second embodiment of the present invention, the cathode 202 and the anode 204 are laminated via the separator 203 to form an electrode laminate. After the electrode laminate is wound to form an electrode wound body, the electrode wound body is arranged at a recessed part of the anode external terminal 206. Then, the nonaqueous electrolytic solution of the present invention is poured into the recessed part of the anode external terminal 206. Finally, the inside of the battery 201 is sealed by the cathode external terminal 205 via the insulating seal material 207, thereby to produce the battery 201.

Herein, materials of the cathode external terminal 205 and the anode external terminal 206 may include, for example, a rectangular shaped or cylindrical shaped outer package body made of metal, and a laminated outer package made of a metallic (for example, aluminum) laminated film.

When the battery is assembled, it is preferable to conduct the following steps described hereinafter, if a carbon material of which interlayer distance d002 is 0.34 nm or less is used for the anode active material. That is, after housing the nonaqueous electrolytic solution, the cathode, the anode and the separator of the present invention and before completely sealing the nonaqueous electrolyte secondary battery, it is preferable to conduct an opening transformation step for conducting charging. This allows a gas generated at the early stage of the charging and residual water in the battery to be completely removed to the outside of the battery. Herein, any methods may be used for removing the generated gas and the residual water. For example, the method may include a natural removing method or a vacuum removing method.

Alternatively, before completely sealing the nonaqueous electrolyte secondary battery, the shape of the battery may be desirably formed by pressing the battery.

[3-5. Advantage and Use of Nonaqueous Electrolyte Secondary Battery of Present Invention]

So far, the development of a nonaqueous electrolyte secondary battery having the following function has been demanded. That is, no reaction is undergone in the nonaqueous electrolytic solution of the battery within the operational voltage of the nonaqueous electrolyte secondary battery, while the electrolytic polymerization is undergone therein when the battery is overcharged and simultaneously the internal resistance of the battery increases, thereby to shut down the charging of the battery. Based on the demand, the present invention has been developed. The nonaqueous electrolyte secondary battery using the nonaqueous electrolytic solution of the present invention has the advantage that the overcharge of the battery can be suppressed by undergoing the electrolytic polymerization when overcharged, and simultaneously the overcharge of the battery can be more effectively suppressed by the increase in the internal resistance of the battery. That is, the charge voltage of the battery increases associated with the increase in the internal resistance of the battery when overcharged, allowing the charging state of the nonaqueous electrolyte secondary battery to be detected appropriately. Therefore, accordingly to the present invention, the nonaqueous electrolyte secondary battery excellent in safety is provided, which can appropriately shut down the charging based on the detected charging state of the battery.

Further, the above mentioned advantage allows the nonaqueous electrolyte secondary battery of the present invention to be used for various purposes. Particularly, the nonaqueous electrolyte secondary battery is excellent in the battery profiles in addition to the safety. This allows the battery to be widely used for not only a secondary battery for a drive power supply of mobile information devices such as a mobile phone and a notebook personal computer, but also a power supply of various devices such as an electric automobile and a hybrid vehicle.

EXAMPLES

Hereinafter, the present invention will be described in detail referring to examples. However, the present invention is not limited to the following examples, and various modifications may be performed without apart from the scope of the present invention. Note the description of "%" means a mass basis unless otherwise noted.

<Evaluation Apparatus>
(1) Measurement of Molecular Weight

The molecular weight and the distribution thereof of the synthesized compound were measured by the gel permeation chromatography (GPC) under the following conditions using polystyrene as a standard substance.

[Measurement Conditions]
Apparatus: Hitachi chromatography (L-6000 model)
Detector: Hitachi parallax refractive index (RI) meter detector (L-3300 model)
Column: Gelpack GL-R440+R450+R400M
Sample concentration: 120 mg/5 ml
Column temperature: 25° C.
Mobile phase: tetrahydrofuran (THF)
Flow rate: 2.05 ml/min
Detector: parallax refractive index meter
Sample injection amount: 200 μl
(2) Identification of Compound The compound identification and the composition analysis of the copolymer were performed by measuring the $^1$H-NMR and $^{13}$C-NMR spectra of the compound, using the following nuclear magnetic resonance (NMR) analysis.

Apparatus: BRUKER AV400M
$^1$H, 400.13 MHz
Solvent: Deuterated chloroform ($CDCl_3$)
<Synthesis of Materials>

Example 1

Diethyleneglycol monobiphenyl ether acrylate (5.0 g), which is an ethoxylated biphenyl acrylate (EO=2 mol), was weighed and placed in a two necked egg-type flask (50 ml) equipped with a thermometer, a reflux condenser, and a stirrer. Then, into the flask, was added azobisisobutyronitrile (AIBN: 50 mg) as a polymerization initiator. Then, after adding dimethyl carbonate (DMC: 20 g) into the flask, the oxygen gas in the flask was removed by an argon gas. The resulting mixture was heated in the oil bath at 65° C. bubbling with an argon gas for 3 hr.

After completing the reaction, cold methanol (30 ml) was gradually added to the reaction mixture with stirring, whereby precipitates were formed. Then, the obtained precipitates were washed several times by cold methanol, to remove the non-reacted monomer and the additive agent, whereby a solid polymer was obtained. The obtained polymer after washing was dried under a reduced pressure at 60° C. to remove methanol, and further dried in vacuo at 80° C. overnight, to give a transparent and pale yellow solid polymer (I: about 3.9 g). The yield was 78%.

The structure of the synthesized polymer (I) was analyzed by $^1$H-NMR. The analysis showed that the polymer (I) had the structure represented by the following formula (4). The GPC analysis of the molecular weight of the polymer (I) showed that the number average molecular weight thereof was 16000.

The yield and the observed number average molecular weight Mn of the polymer (I) are listed in Table 1.

Formula (4)

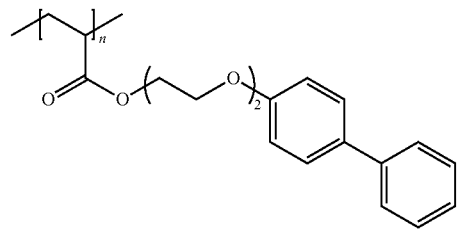

(wherein, the structure represented by the formula (4) corresponds to the structure of the repeating unit in the formula (1) and the formula (2), when both R and R' are hydrogen atoms; X is an alkyl group having 2 carbon atoms; $Y_1$ is a biphenyl group; and "a" is 2).

<Preparation of Nonaqueous Electrolytic Solution>

To a mixed solvent of ethylene carbonate (EC), methyl ethyl carbonate (MEC) and diethyl carbonate (DEC) at the volume rate of 1:1:1, was dissolved $LiPF_6$ to give a concentration thereof of 1.0 mol/l. Then, the polymer (I) was further added so that the final concentration thereof became 3%, whereby the nonaqueous electrolytic solution was prepared. Note, the preparation of the nonaqueous electrolytic solution was conducted in the argon atmosphere. Hereinafter, the nonaqueous electrolytic solution containing the polymer (I) is referred to the electrolytic solution (I).

<Production of Cathode>

To lithium cobaltate (LCO: cathode active material) (93 pts. mass), was added carbon black (3 pts. mass) as a conductive aiding agent and mixed. To the mixture, was added a solution prepared by dissolving polyvinylidene difluoride (PVDF) (4 pts. mass) in N-methyl-2-pyrrolidone (NMP) and mixed, thereby to prepare a slurry containing the cathode mixture.

The obtained slurry containing the cathode mixture was passed through a 70 mesh filter to remove particles each having a large particle diameter. The slurry containing the cathode mixture thus obtained was uniformly applied to one side of the current collector made of the aluminum foil with a thickness of 20 μm. Then, the resultant product was dried. After drying, the product was pressed and cut out to form a cathode in a circle shape with a diameter φ of 1.5 cm. Herein, the applied amount of the slurry containing the cathode mixture was 100 g/m$^2$, and the electrode density thereof was 3.0 g/cm$^3$.

<Production of Anode>

A circle shaped lithium metal having a diameter φ of 1.8 cm was used as the anode.

<Assembling of Battery>

Circle shaped separators made of polyolefine each having a thickness of 25 μm and a diameter φ of 2.5 cm were placed between the cathodes and anodes each having the lead, whereby an electrode group was formed in a battery under assembling. The electrolytic solution (200 μl) was poured thereto. Then, the battery under assembling was sealed by the aluminum laminate to complete the assembling process, whereby the battery was produced finally. Note all of the operations were conducted in an argon box.

<Evaluation Method of Battery>

1. Initializing Method of Battery

The battery thus produced was left at room temperature for 12 hr, and charged with 0.8 mA corresponding to 0.3 Cma (current density: 0.45 mA/cm$^2$) up to 4.3V. Then, the battery was discharged to 3V. Accordingly, the battery was initialized by conducting the above mentioned cycle for 2 cycles. Herein, the discharge capacity after conducting the 2 cycles was defined as the battery capacity of the battery. Further, when the discharge at the second cycle was completed, the DC resistance R was determined based on the voltage lowering ΔE detected after 5 sec from starting the discharge and the current value I at the discharging time.

2. Overcharge Test

The battery thus produced was preliminarily charged with the current of the current density of 0.45 mA/cm$^2$ up to 4.3V. Then, at 60° C., the overcharge test was conducted with the current of 2.4 mA corresponding to 1 CmA (current density: 1.36 mA/cm$^2$) up to 7V as the upper limit. More specifically, the rate (%) of the total charge amount including the charge amount at overcharge to the theoretical capacity of the battery cathode (or the electrical quantity required when all of the Li$^+$ ions leave the cathode material) is calculated. Based on the data, the overcharge profile of the battery was evaluated. Herein, if the voltage does not reach the upper limit of 7V, the overcharge test was conducted using the theoretical capacity of the battery cathode as the upper limit.

The charge amount corresponding to the reaction initiating voltage of the polymer (I) was calculated by the valuable value of the charge amount at the constant voltage (dQ/dV) and the response reaction peak of the polymer (I) in the charge amount curve ("dQ/dV–Q" curve). Then the above mentioned battery which was charged to 4.3V after the initialization was charged to 5V at the constant current with the current of 1 CmA, to complete the charging. The open circuit voltage was also measured after the battery was left at room temperature for 3 hr, so as to evaluate the overcharge degree of the cathode.

Figure 3:
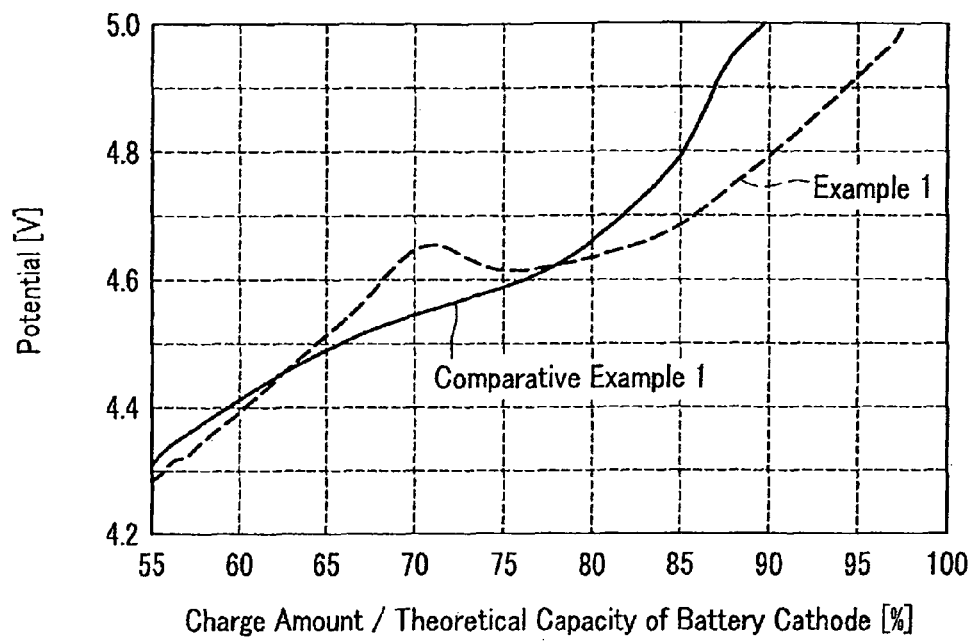
FIG. 3 is a graphic diagram showing the overcharge curve of the electrolytic solution (I) at 60° C.
Figure 4:
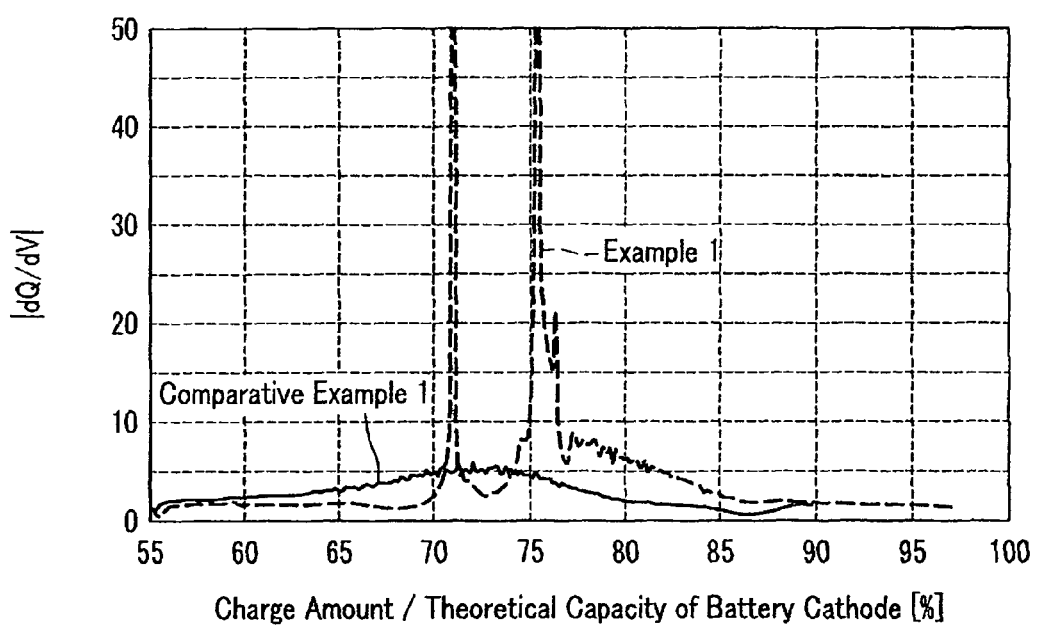
FIG. 4 is a graphic diagram showing the "dQ/dV–Q" curve of the electrolytic solution (I) at 60° C.

FIG. 3 shows the overcharge curve of the electrolytic solution (I) at 60° C. FIG. 4 shows the "dQ/dV–Q" curve of the electrolytic solution (I). Herein, in FIG. 3, the rate (%) of the charge amount at overcharge (or the charge amount Q) to the theoretical capacity of the battery cathode is shown by the horizontal axis.

The reaction response voltage and the corresponded charge amount of the polymer (I) obtained based on the results of FIGS. 3 and 4 are summarized in Table 2.

3. Cyclic Voltammetry (CV) Measurement

A battery was produced comprising an SUS304 electrode (diameter φ=5 mm) as a working electrode, a lithium metal as a counter electrode, and the electrolytic solution (I). By using the battery, the response of the polymer (I) in the SUS electrode was evaluated by measuring the CV. The measurement rate was 5 mV/cm$^2$. The voltage measurement was started from 3V, and conducted in the range of 3V to 5.5V.

Figure 5:
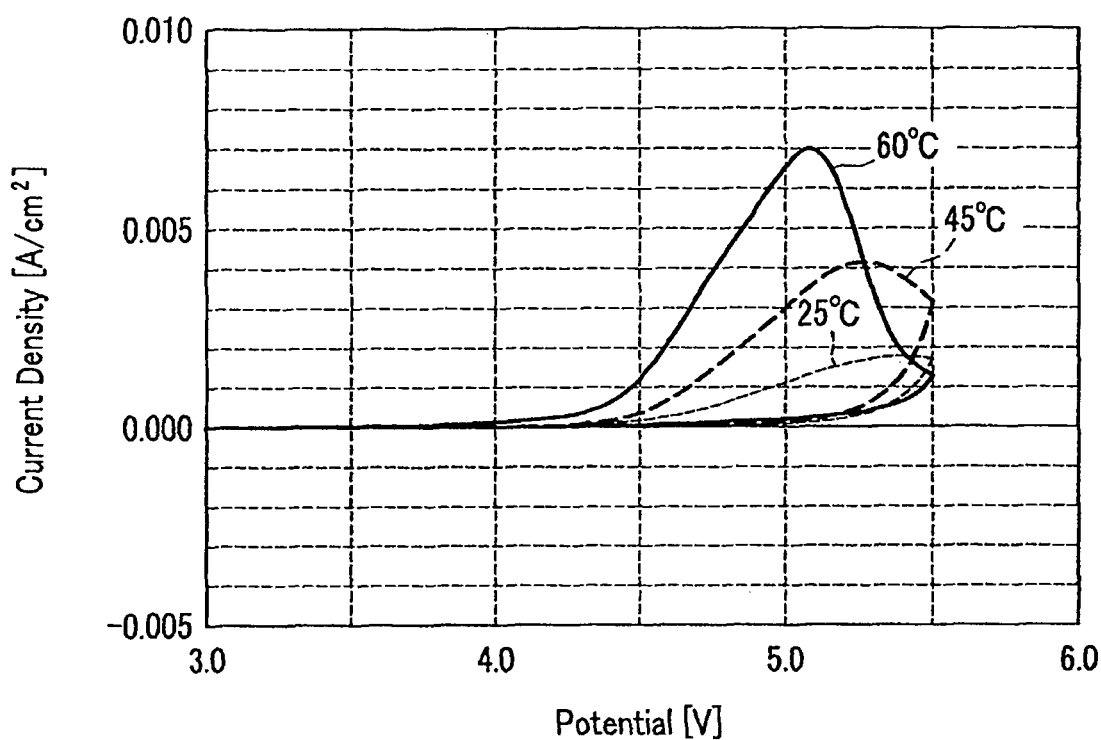
FIG. 5 is a graphic diagram showing the response of the polymer (I) in the SUS electrode, as the CV curve.

As the measurement apparatus, the frequency response analyzer SI12553 model and Potentiostat/Galvanostat (1287 model) (Solartron Ltd., England) were used in the combination thereof. FIG. 5 shows the obtained measurement result.

Example 2

The polymer (II) represented by the following formula (5) was prepared as in Example 1, except that 4-cyclohexylphenol and diethylene glycol monocyclohexylphenyl ether methacrylate (corresponding to ethylene oxide 2 mol additive) were used as the materials. Table 1 shows the yield of the polymer (II) and the number average molecular weight Mn thereof measured as in Example 1.

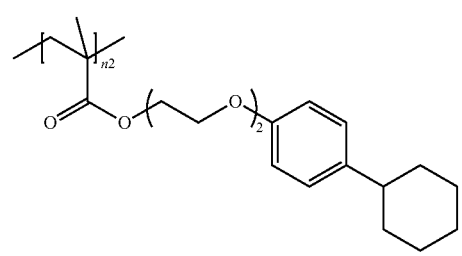

Formula (5)

Further, the electrolytic solution (II) was prepared as in Example 1, except that the polymer (II) was used instead of the polymer (I). Then, various evaluations of the battery using the electrolytic solution (II) were conducted. Table 2 shows the results.

Example 3

The polymer (III) represented by the following formula (6) was prepared as in Example 1, except that 4-phenylbenzoic acid and 4-phenylbenzoic acid diethylene glycol monoallyl ether (corresponding to ethylene oxide 2 mol additive) were used as the materials. Table 1 shows the yield of the polymer (III) and the number average molecular weight Mn thereof measured as in Example 1.

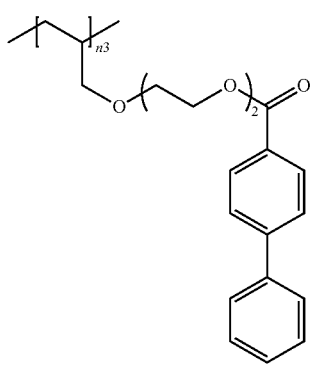

Formula (6)

Further, the electrolytic solution (III) was prepared as in Example 1, except that the polymer (III) was used instead of the polymer (I) and the final concentration of the polymer (III) in the electrolytic solution (III) was set in 4%. Then, various evaluations of the battery using the electrolytic solution (III) were conducted. Table 2 shows the results.

Example 4

The polymer (IV) represented by the following formula (7) was prepared as in Example 1, except that 4-phenylphenol and 4-tetraethylene glycol biphenyl allyl ether (corresponding to ethylene oxide 2 mol additive) were used as the materials. Table 1 shows the yield of the polymer (IV) and the number average molecular weight Mn thereof measured as in Example 1.

Formula (7)

Further, the electrolytic solution (IV) was prepared as in Example 1, except that the polymer (IV) was used instead of the polymer (I). Then, various evaluations of the battery using the electrolytic solution (IV) were conducted. Table 2 shows the results.

Example 5

The polymer (V) represented by the following formula (8) was prepared as in Example 1, except that 4-phenylbenzoic acid vinylglycidyl ether was used as the material. Table 1 shows the yield of the polymer (V) and the number average molecular weight Mn thereof measured as in Example 1.

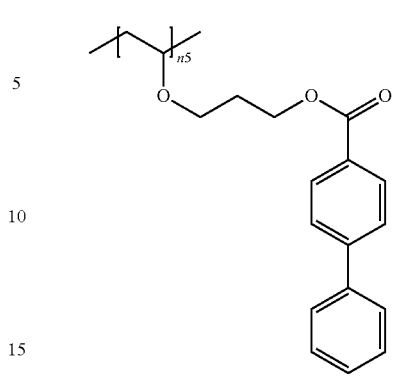

Formula (8)

Further, the electrolytic solution (V) was prepared as in Example 1, except that the polymer (V) was used instead of the polymer (I). Then, various evaluations of the battery using the electrolytic solution (V) were conducted. Table 2 shows the results.

Comparative Example 1

The electrolytic solution was prepared as in Example 1, except that the polymer (I) was not added thereto. Then, various evaluations of the battery using the electrolytic solution thus obtained were conducted. Table 2 shows the results.

Comparative Example 2

The electrolytic solution was prepared as in Example 1, except that the polymer (I) was not added thereto but biphenyl (BP) was added so that the final concentration thereof in the electrolytic solution was 1%. Then, various evaluations of the battery using the electrolytic solution thus obtained were conducted. Table 2 shows the results.

Comparative Example 3

The electrolytic solution was prepared as in Example 1, except that the polymer (I) was not added thereto but cyclohexylbenzene (CHB) was added so that the final concentration thereof in the electrolytic solution was 1%. Then, various evaluations of the battery using the electrolytic solution thus obtained were conducted. Table 2 shows the results.

TABLE 1

Yeald and Number Average Molecular Weight of Each Polymer

| | Polymer | Yield | Number Average Molecular Weight |
|---|---|---|---|
| No. | Structure | (%) | Mn |
| (I) | Formula (4) | 78 | 16000 |
| (II) | Formula (5) | 82 | 21000 |
| (III) | Formula (6) | 53 | 12000 |
| (IV) | Formula (7) | 65 | 15000 |
| (V) | Formula (8) | 49 | 8000 |

TABLE 2

Evaluation of Overcharged Battery Profile

| Example | Polymer added to Electrolytic Solution | Battery Capacity (mAh) | DC Resistance at Initialization (Ω) | Potential Response Profile at 60° C. | | Open Circuit Voltage after Overcharge to 5 V (V) | DC Resistance After Overcharge (Ω) |
|---|---|---|---|---|---|---|---|
| | | | | Potential (V) | Charge Amount (%) | | |
| Example 1 | (I) | 2.43 | 9 | 4.65 | 71.1 | 4.452 | 38 |
| Example 2 | (II) | 2.43 | 9 | 4.78 | 73.7 | 4.457 | 43 |
| Example 3 | (III) | 2.43 | 9 | 4.72 | 72.2 | 4.451 | 43 |
| Example 4 | (IV) | 2.42 | 9 | 4.66 | 70.8 | 4.461 | 40 |
| Example 5 | (V) | 2.42 | 10 | 4.73 | 72.6 | 4.453 | 52 |
| Comparative Example 1 | No addition | 2.43 | 9 | — | — | 4.579 | 8 |
| Comparative Example 2 | (BP) | 2.41 | 10 | 4.58 | 67.2 | 4.449 | 11 |
| Comparative Example 3 | (CHB) | 2.43 | 9 | 4.67 | 66.8 | 4.533 | 12 |

As shown in FIG. 5, the polymer (I) has the potential response profile on the SUS electrode surface, and the response profile thereof depends on the temperature. Further, as shown in FIG. 4, a strong peak is observed at the charge amount of 71.1%. Based on the result and the data of FIG. 3, when the electrolytic solution (I) is used, the maximum potential response profile is observed with the voltage of 4.65V at 60° C., and 4-fold increase in the DC resistance after overcharging is also observed (see Example 1 in Table 2).

Further, as shown in Table 2, when the nonaqueous electrolyte secondary batteries in Examples 2 to 5 are overcharged at 60° C., each polymer dissolved in the electrolytic solution undergoes the electrolytic polymerization in the range from 4.66V to 4.78V. Moreover, each open circuit voltage after overcharging to 5V is smaller than that of Comparative Example 1. These results indicate that the overcharge of the cathode in each Example is suppressed compared to Comparative Example 1. Accordingly, in the case that each of the polymers (II) to (V) is used, the same effect is achieved as in the case that the polymer (I) is used.

Further, each of the batteries produced in Examples 1 to 5 has the greatly improved resistance after overcharging, compared to the batteries including low molecular weight biphenyl (Comparative Example 2) or cyclohexylbenzene (Comparative Example 3) in the electrolytic solution.

According to the present invention, the internal resistance of the battery increases when the battery is overcharged, thereby to increase the overvoltage, allowing the charge voltage to be controlled by suitably monitoring the charging state. As a result, it is possible to provide the lithium-ion battery excellent in the safety profile having the overcharge suppressing function.

Further, the polymer (I) dissolves in the electrolytic solution and undergoes the electrolytic polymerization in the range of 4.3V or more to 5.5V or less at the lithium metal standard voltage. This allows the polymer (I) to have the high electrochemical stability in the battery, and to be used without damaging the battery performance.

What is claimed is:

1. A nonaqueous electrolytic solution comprising:
a polymer which undergoes electrolytic polymerization in the range of 4.3V or more to 5.5V or less at the lithium metal standard voltage, having a repeating unit represented by formula (1);
an electrolytic salt; and
a nonaqueous solvent,

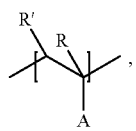

Formula (1)

where A is a functional group which undergoes electrolytic polymerization in the range of 4.3V or more to 5.5V or less at the lithium metal standard voltage, comprising:
an electrolytic polymerization functional group having an aromatic functional group; and
a bonding group comprising a bond binding the aromatic functional group of the electrolytic polymerization functional group to the repeating unit, the bond binding the aromatic function group to the repeating unit selected from the group consisting of an ether bond and an ester bond, and where R and R' are each independently selected from the group consisting of a hydrogen atom and a methyl group.

2. The nonaqueous electrolytic solution as described in claim 1, wherein the functional group A has a structure represented by a formula (2):

$$-(C=O)-O-(X-O)_a-Y_1 \qquad \text{Formula (2)},$$

where, X is selected from the group consisting of an alkyl group having 1 to 6 carbon atoms and an aromatic functional group,
where $Y_1$ comprises an aromatic functional group,
where $Y_1$ undergoes the electrolytic polymerization in the range of 4.3V or more to 5.5V or less at the lithium metal standard voltage, and
where "a" is an integer from 0 or more to 10 or less as an average value thereof.

3. The nonaqueous electrolytic solution as described in claim 1, wherein the functional group A has a structure represented by a formula (3):

$$-(CH_2)_b-O-Y_2 \qquad \text{Formula (3)},$$

where $Y_2$ comprises an aromatic functional group,
where $Y_2$ undergoes the electrolytic polymerization in the range of 4.3V or more to 5.5V or less at the lithium metal standard voltage, and
where "b" is 0 or 1.

4. The nonaqueous electrolytic solution as described in claim 1, wherein the electrolytic salt is a lithium metal salt.

5. The nonaqueous electrolytic solution as described in claim 1, wherein the nonaqueous solvent includes a cyclic carbonate and a chain carbonate.

6. A nonaqueous electrolyte secondary battery, comprising the nonaqueous electrolytic solution as described in claim 1, a cathode, an anode, and a separator.

7. The nonaqueous electrolyte secondary battery as described in claim 6, wherein each of the cathode and the anode has a lithium-ion intercalation/de-intercalation ability.

8. The nonaqueous electrolytic solution as described in claim 1, wherein the number average molecular weight of the polymer is 2000 or more to 21000 or less.

9. The nonaqueous electrolytic solution as described in claim 1, wherein the aromatic functional group is selected from the group consisting of a biphenyl and an alkylbiphenyl.

\* \* \* \* \*